Aug. 10, 1926.

D. W. SMITH

PIE MAKING MACHINE

Filed Oct. 14, 1925   5 Sheets-Sheet 2

1,595,428

Witnesses:
Wayne Hudson
John E. Titus

Inventor:
Dennis W. Smith
By Rummler & Rummler
Attys

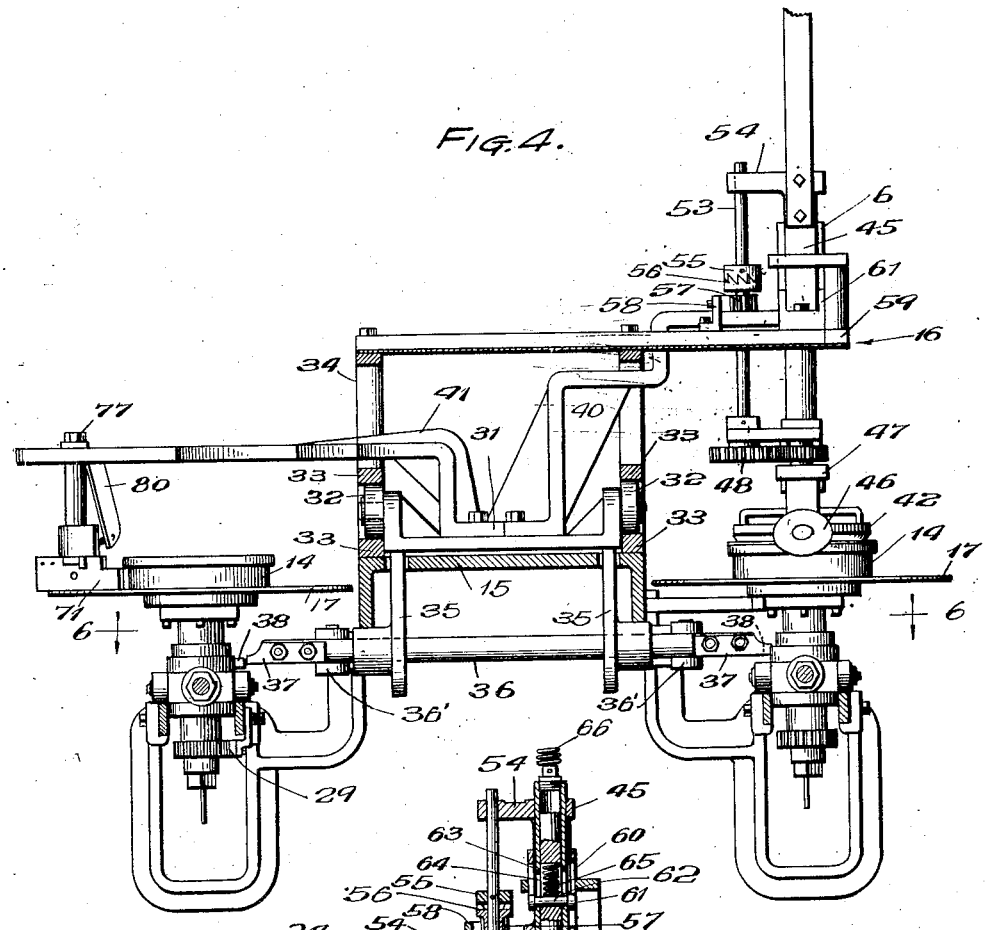

Aug. 10, 1926. 1,595,428
D. W. SMITH
PIE MAKING MACHINE
Filed Oct. 14, 1925  5 Sheets-Sheet 4

Aug. 10 1926.  1,595,428

D. W. SMITH

PIE MAKING MACHINE

Filed Oct. 14, 1925   5 Sheets-Sheet 5

Witnesses:
Wayne Hudson
John E. Titus

Inventor
Dennis W. Smith
By Rummler & Rummler
Attys.

Patented Aug. 10, 1926.

1,595,428

UNITED STATES PATENT OFFICE.

DENNIS W. SMITH, OF WILMETTE, ILLINOIS, ASSIGNOR TO COLBORNE MANUFACTURING COMPANY, OF CHICAGO, ILLINOIS, A CORPORATION OF ILLINOIS.

PIE-MAKING MACHINE.

Application filed October 14, 1925. Serial No. 62,378.

This invention relates to pie making machines and more particularly to improvements in the pie trimming and scrap removing devices and the like in such machines wherein various operations are performed on each of a continuously moving train of pie supports.

Heretofore the various operating devices stationed along the path of the supports have been independently driven in synchronism with each moving holder. Since the conveyer belt or driving means upon which the holders are mounted is of great length it is subject to stretching and variations in the relative distances between supports. Also considerable looseness is requisite in any type of belt. Therefore, accurate alignment and timing of independently driven operating devices has been difficult to accomplish.

The chief characteristics of this invention are that the operation performing devices are connected directly to each support and thereby moved by the support the desired length of travel in accurate correlation; and the moving elements of said device are actuated by virtue of said connection, and thereby more accurate timing is secured.

Also in former trimming devices the forms were set over the pie and the form and pie rotated with the trimming element held in non-rotative relation. Such devices are unsuccessful in producing pies which bake properly and difficulty has been met in removing the trimmings from the carrier plate where the scrap remover and the trimmer were combined. Therefore the main objects of this device are to more accurately time and align the operating devices with the traveling pies, to produce improved means for trimming the pie which properly seals the edges of the crusts, and to provide improved means for removing the scrap.

An illustrative embodiment of my invention is shown in the accompanying drawings, in which:—

Fig. 4 is a section on line 4—4 of Fig. 1.

Fig. 5 is a section on line 5—5 of Fig. 1.

Figure 1:
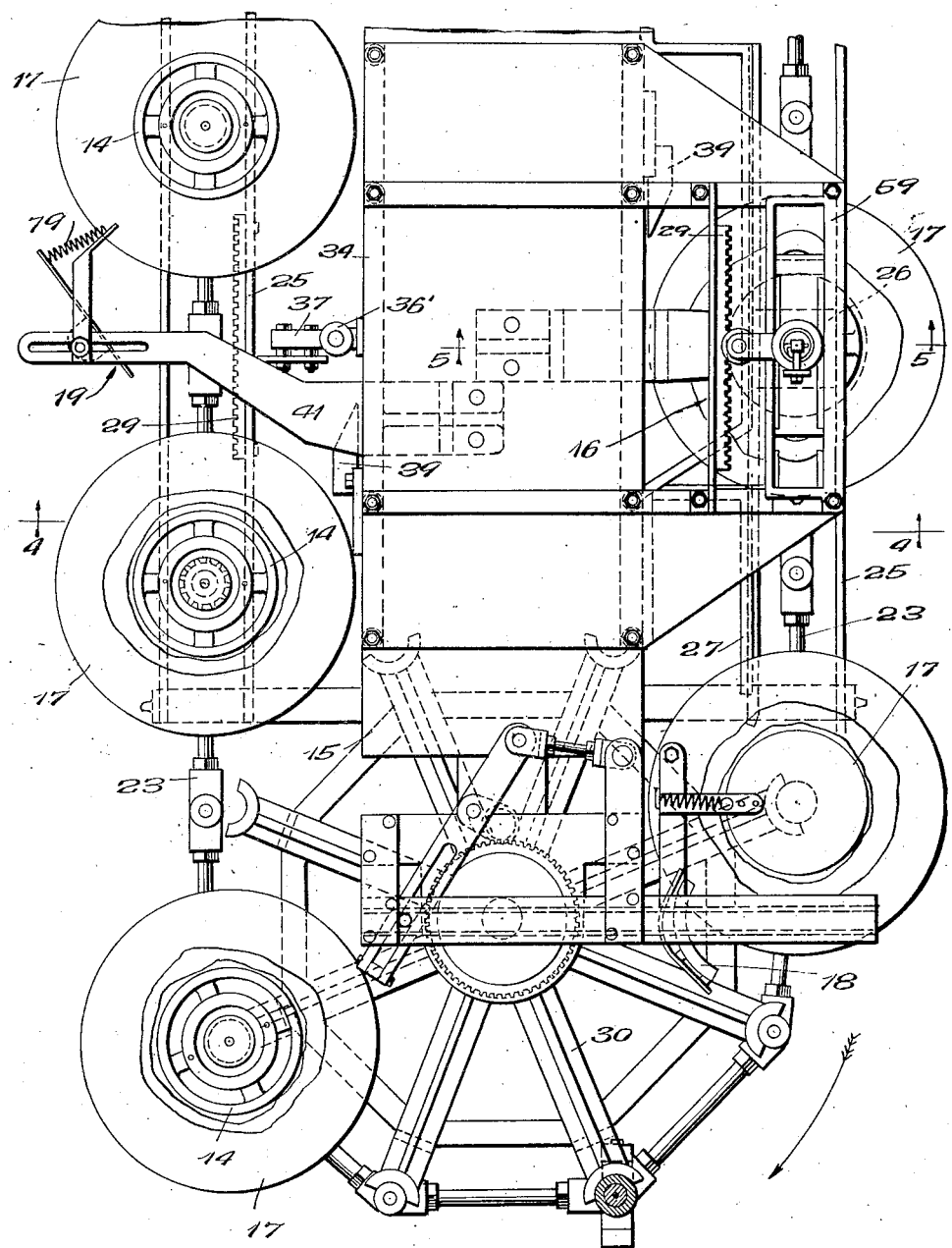
Figure 1 is a plan view of the finishing end of the pie machine.

In the pie machine illustrated in the drawings, the pie holders 14 are carried in the same horizontal plane along the sides and around the ends of the elongated machine frame 15 upon which are mounted the various operation performing devices. As the holders are carried along pie tins are inserted in the holders 14 and the pies are formed therein. Then the upper crust is rolled out and dropped over the whole.

The untrimmed pies are traveling toward the observer along the right side of the machine as viewed in Fig. 1. The pies move past the trimmer 16 which trims the pie to shape leaving the trimmings or scrap lying on the discs 17 upon which the holders 14 are mounted. Then the pies are lifted out of the holders 14, moved aside and ejected from the machine by the fender 18 and the empty carriers move around to the scrap remover 19 which scrapes the dough off the disc 17 and makes the carriers ready for receiving new pies.

The discs 17 are mounted on the vertical posts 20 which are rotatably supported in the links 21 and forks 22 of the conveyer chain 23. Secured on the sides of the link members 21 are rollers 24 which ride on the rails 25 and support the carriers at the sides of the machine, the rails 25 being suspended from the frame 15. For holding the posts 20 from lateral movement, the lower part of the fork member 22 fits closely between the rails 25, and square cams 26 are attached on the post 20 to hold the pie from rotating when in relation with the trimmer 16 by engaging the stationary cam rails 27. The gear 28 keyed on the lower end of the post 20 is provided to rotate the pie support when in relation with the scrap remover 19 by engaging with the stationary rack 29 which is secured to one of the rails 25 adjacent the scraper station.

At the ends of the machine the conveyer belt, formed as described is supported and driven by the large horizontally mounted sprocket wheels 30 and the portions of the belt on either side of the machine are moving in opposite directions. Therefore the carriage 31 is reciprocated in predetermined positions by being attached to each succeeding carrier element at first one side and then the other. The carriage 31 is provided with four rectangularly spaced wheels 32 which run between the two pairs of vertically spaced rails 33 of the superstructure 34 which is bolted on the frame 15. Suspended from the carriage 31 by the depending arms 35 is a shuttle bar or transversely slidable ram 36 having end plates 37 which are alternately engaged with the lugs 38 which are secured in the upper member of the forks 22 of the oppositely moving carrier elements. At each end of the travel determined for the carriage a cam 39 is mounted on either side of the frame 15 in position to engage corresponding rollers 36' on the bar 36 to withdraw the end plate 37 from engagement with the lug 38 on the carrier on the opposite side of the machine and shift the bar so that the corresponding end plate is in position to be engaged by the lug on the next pie carrier on the adjacent side of the machine. Therefore, in effect, the carriage 31 is attached to each carrier element.

On the right hand side (Fig. 4) of the carriage is mounted the trimmer element 16 supported by the carriage bracket 40, and the scrap removing device 19 is supported by the bracket 41 extending from the left side of the carriage 31.

In the trimming element the circular die member 42 is fastened to the lower shouldered end of the vertical shaft 43 which is slidably mounted in the oppositely slotted hub portion 45 of the support bracket 40. The frusto-conical trimming rollers 46 are oppositely mounted on the trimmer head 47 keyed on the sleeve 48 which is rotatable on the shaft 43 with a slight amount of play between the lower end of sleeve 44 and the hub of the member 42 which supports the sleeve 48.

The gear 49 is also keyed on the sleeve 48 and meshes with the gear 50 which is rotatably supported by the arm 51 carried by the sleeve 48. The sleeve 48 turns in the arm 51 and holds the arm between the hub of the gear 49 and a set collar 52. Secured in the bore of the gear 50 is a jack shaft 53 which is guided through the support portion 54 of the bracket 40 and in the upper bracket extension arm 54. A clutch collar 55 is pinned on the shaft 53 and cooperates with a clutch 56 in the upper end of the pinion 57 which is loosely mounted on the jack shaft 53 and rests on the bracket portion 54 in engagement with the stationary rack 58 secured to the extending portion 49 of the superstructure 34.

Also supported in the superstructure 34 are the driving cam plates 60 and lifting cams 61 suitably arranged on either side of the hub 45, to drive the cam rollers 61 down when the carriage is moving with the pie and raise the rollers 62 when the carriage is traveling reversely.

As shown in Fig. 5 the cam rollers 61 are mounted on the ends of the short bar 62 which extends through slotted portions 63 and 64 in the sleeve 44 and the shaft 43 respectively and is pressed towards the bottom of the shaft slot 64 by the spring 65. The sleeve 44 with the members supported thereby is drawn upwardly by the spring 66 which attaches to the top of the sleeve 44 and to the spring support bar 67 bolted to the bracket hub 45.

To position the cam rollers 61 to be engaged by the lower edges of the cam plates 60 after the rollers have traveled back over the upper edges, the upward movement of the sleeve 44 is limited by the stop shoulder 68 on the sleeve contacting with the lower end of the relatively stationary hub 45. In moving over the upper end of the cams 60 the spring 65 is compressed so that when the rollers 61 are moved clear of the cam they are forced down below the cam points. Thus a carrier having an untrimmed pie picks up the carriage with the trimming head 47 and die 42 in raised position but aligned with the pie holder and the clutch members 55 and 56 disengaged. During the subsequent correlated movement of the carriage and pie support the sleeve with the concentric shaft 43 and the shaft 53 carried at the side are lowered moving the clutch 55 into engagement for rotating the trimmer head 47, positioning the die member 42 on top of the pie and engaging the trimming rollers with the periphery of the pie holders 14. The overlapping portions of the crusts are severed and trimmed edges of the crusts are bound together by the pressure from the relatively angular surfaces of the rollers, and the crust trimmings drop onto the disc 17.

Figure 7:
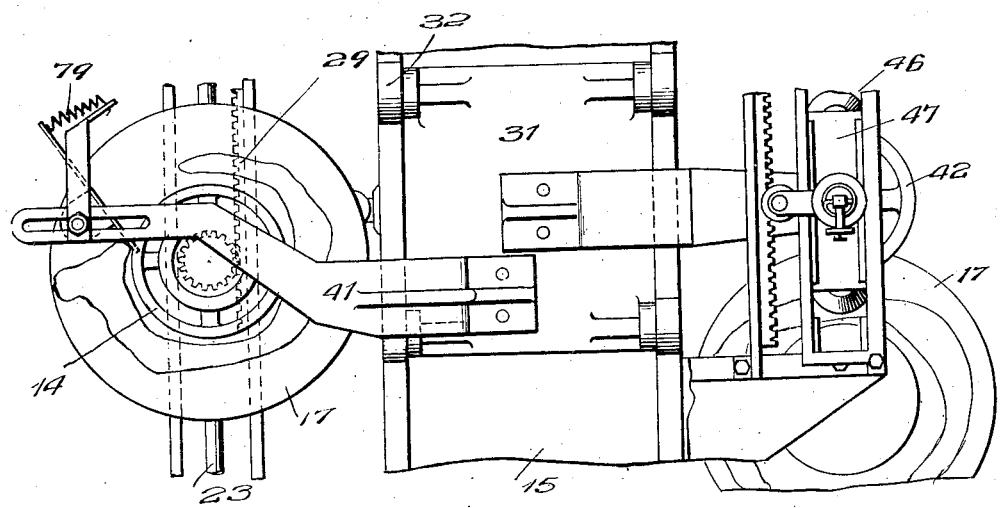
Fig. 7 is a view of a portion of Fig. 1 with the carriage in changed position.
Figure 8:
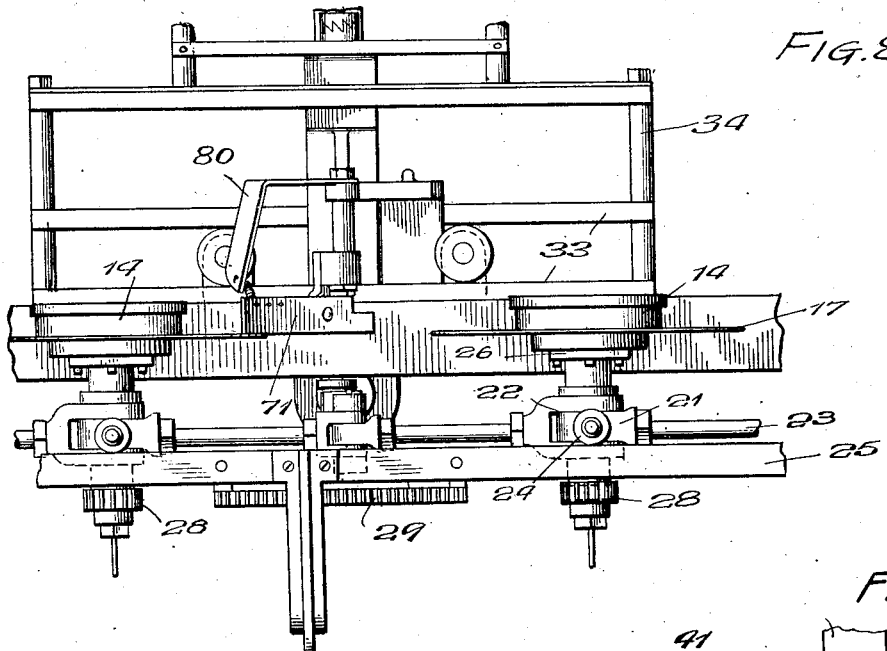
Fig. 8 is an elevation of a portion of Fig. 1 looking from the left side.
Figure 9:
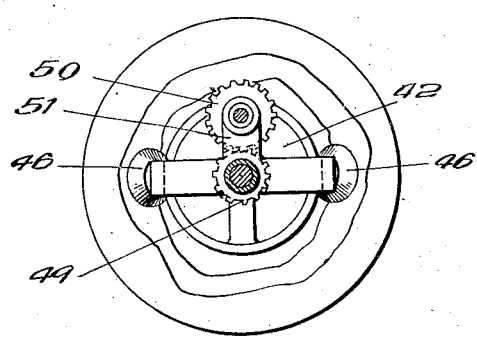
Fig. 9 is a section on line 9—9 of Fig. 2.
Figure 10:
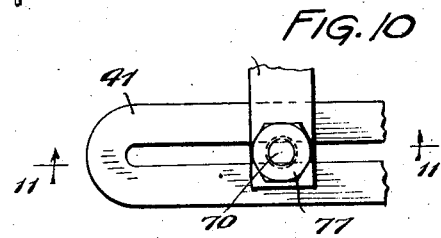
Fig. 10 is an enlarged view of the end of the scrap remover support arm shown in Fig. 1.
Figure 11:
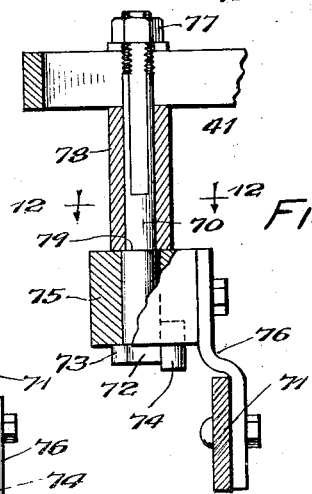
Fig. 11 is taken on line 11—11 of Fig. 10.
Figure 12:
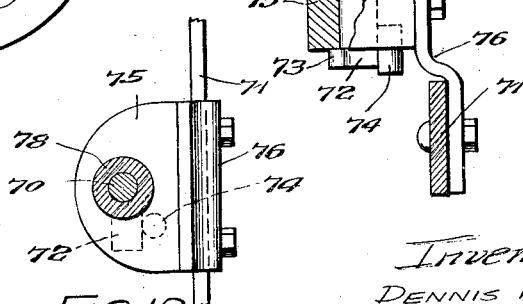
Fig. 12 is taken on line 12—12 of Fig. 11.

Near the end of the correlated movement the sleeve 44 with the die 42 and trimming head 47, is raised by the cam 61. The carriage is disconnected and the plunger 36 positioned to be engaged by the next holder moving on the left or opposite side of the machine which then picks up the carriage with the scraper blade in close relation with the surface of the disc 17 as shown in Fig. 7, and the gear 28 meshing with the stationary rack 29 for rotating the disc.

The scraper blade is mounted as follows: The extending end of the scraper bracket 41 is slotted for engaging the flattened sides of the stud 70 thereby preventing the stud from rotating so that a stop against inward rotation of the scraper blade 71 may be provided by the lug 72 on the lower head 73 of the bolt or stud 70. The lug 72 contacts the pin 74 in the block 75 which is rotatably mounted on the bolt 70, and the scraper blade is secured to the block 75 by means of the plate 76. The block 75 is supported by the bolt head 73 and the bolt is clamped in adjusted position by the nut 77 drawing up on the tube 78 placed between the stud shoulder 79 and the under side of the arm 41. To yieldingly hold the blade 71 against rotating away from the stop, the coil spring 79 is fastened to the outer end of the blades and to the depending arm of the spring support 80 which is clamped in position under the nut 77.

The operation performing elements are very accurately aligned with every pie holder in the train because they are attached to and driven by each carrier element during the cooperative relation therewith. The trimming roller rides evenly around the edges of the holder and also the wear of the driving member is reduced by providing the ratchet clutch members 55 and 56 so that the trimming head 47 is only driven in one direction and allowed to stop rotating during the return or inoperative period of travel of the carriage.

No attempt is made to scrape the trimmings from the disc 17 by any of the same mechanism that is used for the trimming process since the dough sticks to the plate and is difficult to remove. Accordingly the scraping process has been disassociated with the trimming process. As a result the discs 17 may be rotated at a high rate of speed under close adjustment of the scraper blade 71 with no danger of causing damage to the pie as may be done when the scrap is removed on a plate with the pie still in the holder.

The carriage 15 is adaptable for carrying similar operating elements to those shown, being reciprocated as described by being alternately attached to oppositely moving portions of the conveyer belt.

Figure 2:
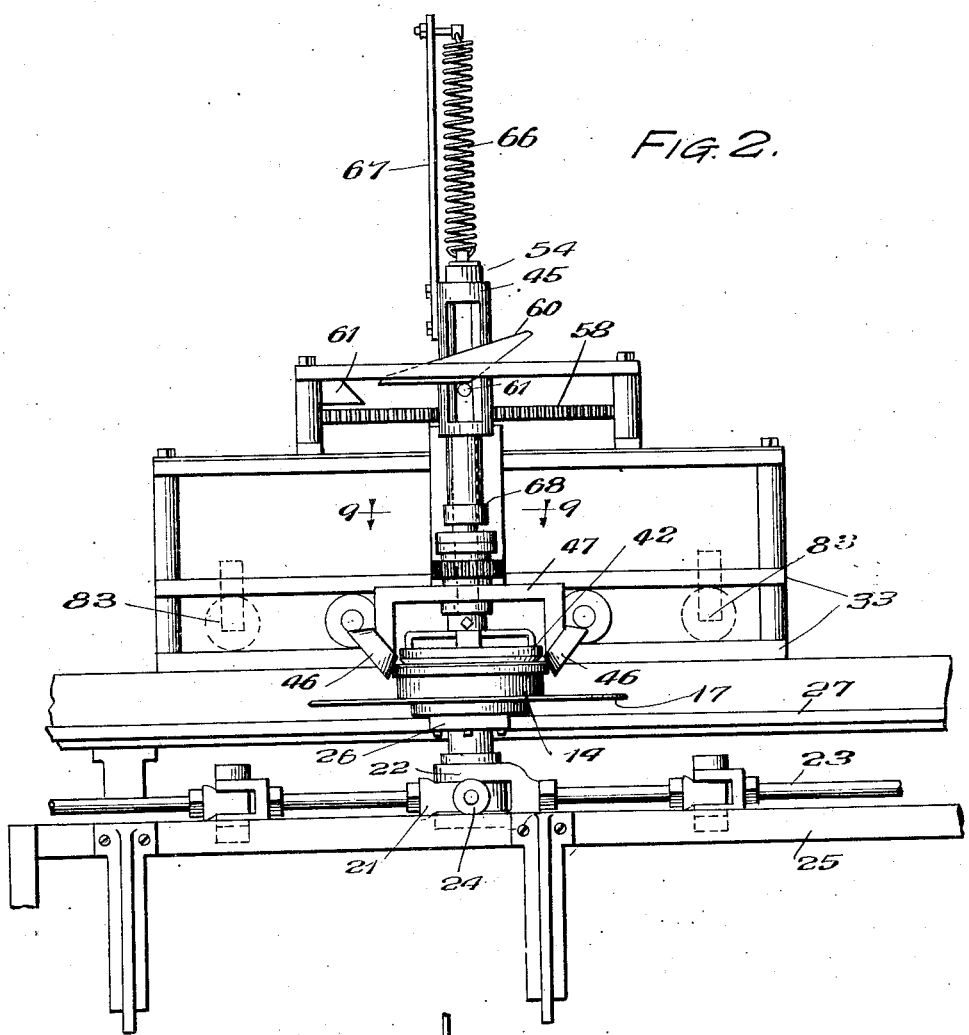
Fig. 2 is an elevation from the right side of Fg. 1.
Figure 3:
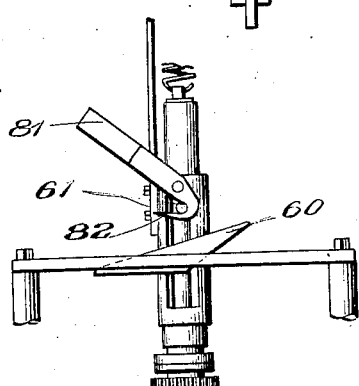
Fig. 3 is a view of a portion of Fig. 1, showing an added feature.
Figure 6:
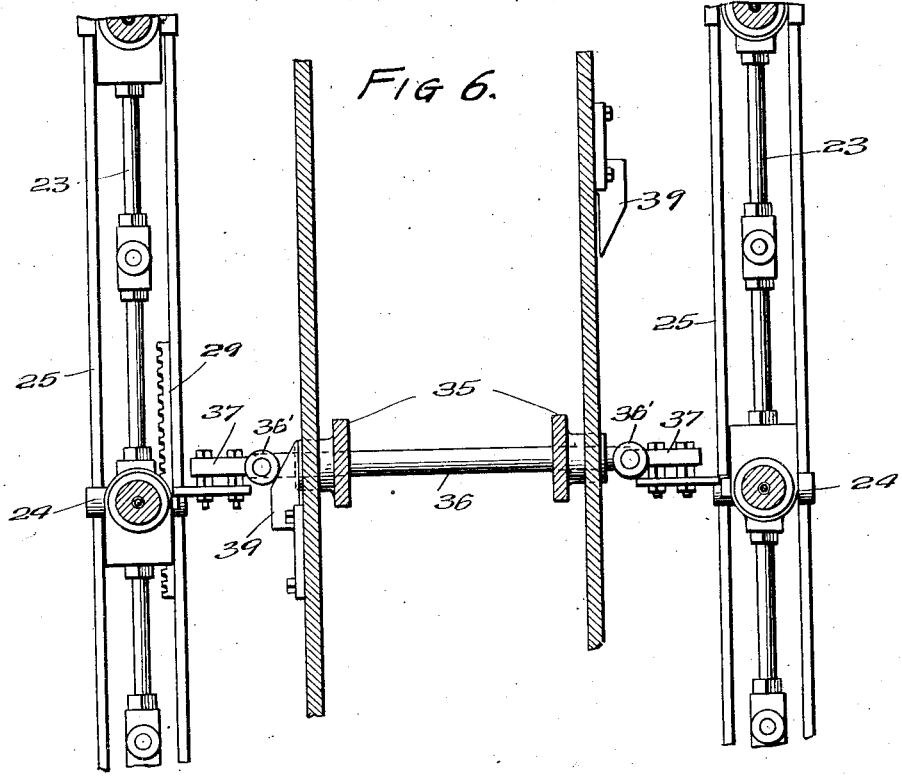
Fig. 6 is a section on line 6—6 of Fig. 4.

To hold the rotating trimming head 47 in an inoperative position a cam lever 81 is pivoted on the bracket hub 45 as shown in Fig. 3, and the cam fingers 82 and 81 are engaged with and hold the rollers 61 in raised position. Then the trimming rollers 83 for square pies, indicated in dotted lines in Fig. 2, may be set in place rendering the same machine adaptable for making either round or square pies.

While but one illustrative embodiment of each of the features of this invention has been shown many variations and omissions may be made without departing from the spirit of the invention.

I claim:

1. In combination in a pie making machine adapted to form pies on a conveyer having oppositely moving portions, pie tin supports on said conveyer, a carriage for pie making operation performing elements mounted between said portions, and means for alternately attaching the carriage to each succeeding pie carrier in the oppositely moving portions of said conveyer.

2. In combination a pie making machine adapted to form pies on a continuously moving conveyer having oppositely moving portions, a carriage for operation performing elements mounted between the said portions, a slidably mounted shuttle bar in transverse position in said carriage, and means for projecting the said bar alternately into engagement with the oppositely moving portions of the conveyer to reciprocate the carriage directly by the conveyer.

3. In combination in a pie machine having an endless train of moving pie carriers having lugs and with adjacent portions of the train moving in opposite directions, a carriage for operation performing elements mounted between the oppositely moving train portions, a transversely slidable bar mounted on the carriage, and spaced stationary cams oppositely arranged for engaging the bar to project the ends of the bar alternately into the path of each succeeding carrier lug in the oppositely moving portions of the train of carriers.

4. In a pie making machine having moving pie carriers, a carriage for supporting operation performing elements which is adapted to be attached to each succeeding pie carrier for cooperation therewith, a trimming element rotatably mounted on the carriage in operative relation to the pie carrier to which said carriage is attached, and means for lowering the trimming element into engagement with the pie.

5. In a pie making machine having moving pie carriers, a carriage for supporting operation performing elements which is adapted to be attached to each succeeding pie carrier for cooperation therewith, a trimming element rotatably mounted on the carriage in operative relation to the pie carrier to which said carriage is attached, means for lowering the trimming element into engagement with the pie, and a ratchet operated connection for rotating the trimmer head in one direction.

6. In combination in a pie making machine, a rotatably mounted pie carrier mounted on a moving support, means for holding the carrier from turning, a movable carriage adapted to be attached to the pie carrier, a vertical member slidable in the said carriage in alignment with the pie during the period of attachment, a die mounted on the slidable member, means for lowering the said member to engage the die and means for restoring the carriage and said parts mounted thereon to starting position when disengaged from the carrier.

7. In combination in a pie making machine a moving train of rotatably mounted pie carriers, means for holding the carriers from turning, a movable carriage adapted to be attached to each succeeding pie carrier, and an operation performing element slidable in the carriage and adapted to be moved into operative relation with the pie during the period of attachment.

8. In combination in a pie making machine a moving train of rotatably mounted pie carriers, means for holding the carriers from turning, a movable carriage adapted to be attached to each succeeding pie carrier, a yieldingly supported pie trimmer rotatably mounted in the carriage, a stationary cam for moving the pie trimmer into engagement with the pie during the period of attachment and means for simultaneously rotating the pie trimmer, and an operation performing element slidable in the carriage and adapted to be moved into operative relation with the pie during the period of attachment.

9. In combination in a pie making machine a moving train of rotatably mounted pie carriers, means for holding the carriers from turning, a movable carriage adapted to be attached to each succeeding pie carrier, a yieldingly supported pie trimmer rotatably mounted in the carriage, a stationary cam for moving the pie trimmer into engagement with the pie during the period of attachment and a stationary rack adapted to rotate the said gear and rotate the pie trimmer during said attachment.

10. In combination in a pie making machine a moving train of rotatably mounted pie carriers, means for holding the carriers from turning, a movable carriage adapted to be attached to each succeeding pie carrier, a sleeve yieldingly supported in the carriage, a shaft yieldingly held in the sleeve having cam rollers, a die element on said shaft and a stationary cam for lowering the sleeve to engage the die element with the pie.

11. In combination in a pie making machine a moving train of rotatably mounted pie carriers, means for holding the carriers from turning, a movable carriage adapted to be attached to each succeeding pie carrier, a sleeve yieldingly supported in the carriage, a shaft yieldingly held in the sleeve having cam rollers, a pie trimming element rotatable on the shaft and having rotating means including a gear and a clutch, a stationary rack meshing with the gear, and a stationary cam adapted to engage said cam rollers to lower the trimming element and engage the said clutch and gear when the carriage is attached to a pie carrier.

12. In a pie making machine adapted to form pies on a continuously moving conveyer having oppositely moving portions, a carriage mounted between and adapted to be reciprocated by said oppositely moving portions, a pie trimming element at one side and a scrap remover at the other side mounted on the carriage and alternately in operative relation with the conveyer.

13. In combination in a pie making machine having an endless train of rotatable pie carriers with adjacent portions of the train moving oppositely, a movable carriage between said adjacent portions and adapted to be alternately attached to each succeeding pie carrier of said portions, at one side a rotatable pie trimmer mounted on the carriage, a stationary member for holding the pie carriers from rotating, a stationary rack for rotating the pie trimmer, and at the opposite side a scrap remover mounted on the carriage and a second stationary rack for rotating the pie carrier.

14. In combination in a pie making machine, a rotatably mounted moving pie support having a gear fixed thereon, a movable carriage adapted to be attached to said support, a scraper element on said carriage and a stationary rack adapted to engage said gear to rotate the pie support when said carriage is attached.

15. In combination in a pie making machine, a rotatably mounted moving pie support having a gear fixed thereon, a movable carriage adapted to be attached to said support, a scraper element on said carriage, and a stationary rack adapted to engage said gear to rotate the pie support when said carriage is attached, and means for yieldingly holding the scraper element from rotating with the pie support.

Signed at Chicago this 3rd day of October, 1925.

DENNIS W. SMITH.